(12) United States Patent
Wilhelm et al.

(10) Patent No.: US 12,490,187 B2
(45) Date of Patent: Dec. 2, 2025

(54) DISCONTINUOUS RECEPTION ENHANCEMENTS

(71) Applicant: Apple Inc., Cupertino, CA (US)

(72) Inventors: Mikhail Wilhelm, Munich (DE); Ralph Hasholzner, Munich (DE); Christian Drewes, Germering (DE)

(73) Assignee: Apple Inc., Cupertino, CA (US)

( * ) Notice: Subject to any disclaimer, the term of this patent is extended or adjusted under 35 U.S.C. 154(b) by 560 days.

(21) Appl. No.: 17/902,722

(22) Filed: Sep. 2, 2022

(65) Prior Publication Data

US 2023/0094143 A1     Mar. 30, 2023

Related U.S. Application Data

(60) Provisional application No. 63/248,420, filed on Sep. 24, 2021.

(51) Int. Cl.
*H04W 52/00* (2009.01)
*H04W 52/02* (2009.01)

(52) U.S. Cl.
CPC ... *H04W 52/0216* (2013.01); *H04W 52/0225* (2013.01)

(58) Field of Classification Search
None
See application file for complete search history.

(56) References Cited

U.S. PATENT DOCUMENTS

| | | | | |
|---|---|---|---|---|
| 2015/0019717 A1* | 1/2015 | Li | ......................... | H04W 8/005 709/224 |
| 2021/0105624 A1* | 4/2021 | Sardesai | ................. | H04W 4/50 |
| 2022/0330152 A1* | 10/2022 | Hande | ................. | H04W 52/028 |
| 2023/0047375 A1* | 2/2023 | Zacharias | ......... | H04W 56/0015 |
| 2023/0104340 A1* | 4/2023 | Park | ................... | H04W 52/0216 370/329 |
| 2023/0115633 A1* | 4/2023 | Park | ................... | H04W 72/0446 370/311 |

(Continued)

OTHER PUBLICATIONS

[Unknown Author], "3rd Generation Partnership Project; Technical Specification Group Radio Access Network; NR; Radio Resource Control (RRC) protocol specification (Release 15)," 3GPP TS 38.331 V15.14.0, Jun. 2021, 540 pages.

(Continued)

*Primary Examiner* — Brandon M Renner
(74) *Attorney, Agent, or Firm* — Fish & Richardson P.C.

(57) ABSTRACT

Methods, systems, apparatuses, and computer programs for offloading computing tasks to one or more computers, e.g., that implement an edge server. In one aspect, the method can include actions of transmitting, for a user equipment and to the one or more computers, uplink information via an air interface; determining whether the uplink information has been fully transmitted across the air interface; based on determining that the uplink information has been fully transmitted across the air interface, triggering a sleep mode for the user equipment and starting a first timer; determining that the first timer has expired; and based on determining that the first timer has expired, triggering (i) a user equipment wake-up operation and (ii) maintaining a second timer that indicates when the user equipment should enter the sleep mode if result data, to be generated using the uplink information, has not been received.

20 Claims, 9 Drawing Sheets

(56) References Cited

U.S. PATENT DOCUMENTS

2023/0300743 A1* 9/2023 Li .................... H04L 1/1812
370/318
2024/0365230 A1 10/2024 Wilhelm et al.

OTHER PUBLICATIONS

[Unknown Author], "3rd Generation Partnership Project; Technical Specification Group Radio Access Network; NR; Medium Access Control (MAC) protocol specification (Release 16)," 3GPP TS 38.321 V16.5.0, Jun. 2021, 157 pages.
[Unknown Author], "3rd Generation Partnership Project; Technical Specification Group Services and System Aspects; System architecture for the 5G System (5GS); Stage 2 (Release 16)," 3GPP TS 23.501 V16.10.0, Sep. 2021, 453 pages.
Hu et. al., "Quantifying the Impact of Edge Computing on Mobile Applications," Proceedings of the 7th ACM SIGOPS Asia-Pacific workshop on systems, Aug. 2016, 8 pages.
Qualcomm, "New SID on XR Evaluations for NR," 3GPP TSG RAN Meeting #86, RP-193241, Sitges, Spain, Dec. 9-12, 2019, 6 pages.

* cited by examiner

DISCONTINUOUS RECEPTION ENHANCEMENTS

CROSS-REFERENCE TO RELATED APPLICATIONS

The present application claims the benefit of U.S. Provisional Application No. 63/248,420, filed on Sep. 24, 2021, which is herein incorporated by reference in its entirety.

BACKGROUND

Wireless communication networks provide integrated communication platforms and telecommunication services to wireless user devices. Example telecommunication services include telephony, data (e.g., voice, audio, and/or video data), messaging, internet-access, and/or other services. The wireless communication networks have wireless access nodes that exchange wireless signals with the wireless user devices using wireless network protocols, such as protocols described in various telecommunication standards promulgated by the Third Generation Partnership Project (3GPP). Example wireless communication networks include code division multiple access (CDMA) networks, time division multiple access (TDMA) networks, frequency-division multiple access (FDMA) networks, orthogonal frequency-division multiple access (OFDMA) networks, Long Term Evolution (LTE), and Fifth Generation New Radio (5G NR). The wireless communication networks facilitate mobile broadband service using technologies such as OFDM, multiple input multiple output (MIMO), advanced channel coding, massive MIMO, beamforming, and/or other features.

Discontinuous Reception (DRX) is a powerful technique that has applicability for User Equipment (UE) including, but not limited to, smartphones, tablets, wearables, and the like. DRX is a method that can be used to reduce a UE's power consumption. DRX can reduce UE power consumption by cycling its activity periods and inactivity periods.

Multi-Access Edge Computing (MEC) can allow UEs to offload certain computation-heavy tasks (face/voice recognition, image rendering, etc.) to an edge server, which is located close to the radio access network (RAN). MEC offloading can offer shorter response times and round-trip reduction in latencies than conventional cloud-computing applications. Short response times can be important for real-time and latency-critical applications, such as many Virtual or Augment Reality applications.

In Narrowband—IoT, special "wake-up signals" were introduced in Rel. 15 to be used instead of timers. They also allow to avoid waiting times till the next DRX cycle. The signals are meant to be used only for DRX in RRC-IDLE mode to reduce paging delay. However, wake-up signals require significant receiver and transmitted modifications at the UE and base station (gNB) side.

SUMMARY

When a user equipment (UE) determines to offload one or more tasks to one or more remote computers, e.g., a remote server system, the user equipment can use one or more timers. A first timer can indicate a time when the UE should wake up to monitor for a data responsive to the task, e.g., when the UE goes to sleep after transmitting uplink information as part of a task request. A second timer can indicate a time when the UE should go back to sleep if the responsive data has not yet been received.

The use of one or both timers can reduce power usage by the UE, reduce a latency between when the UE transmits the uplink information and receives a response, or both. For instance, the use of the first timer can result in a latency savings, e.g., of 300 ms. In some examples, the use of one or both timers can enable the UE to offload processing for latency-sensitive applications, applications that require more computational power than the UE current has, e.g., given battery limitations, or both. The use of both timers can improve execution of computationally heavy image and video processing applications. For example, the use of both timers can improve enhanced reality, augmented reality, virtual reality, or a combination of these, applications. The use of the first timer can enable the UE to avoid a delay in receipt of the responsive data since the first timer can be determined based on an expected reception time, e.g., earlier than the UE would wake otherwise given a predetermined wake cycle for the UE.

In accordance with one aspect of the present disclosure, a method can include transmitting, for a user equipment and to the one or more computers, uplink information via an air interface; determining whether the uplink information has been fully transmitted across the air interface; based on determining that the uplink information has been fully transmitted across the air interface, triggering a sleep mode for the user equipment and starting a first timer; determining that the first timer has expired; and based on determining that the first timer has expired, triggering (i) a user equipment wake-up operation and (ii) maintaining a second timer that indicates when the user equipment should enter the sleep mode if result data, to be generated using the uplink information, has not been received.

In accordance with one aspect of the present disclosure, a method can include determining, for a user equipment, a first duration for a first timer that indicates a time period during which the user equipment should sleep after submitting uplink information as part of a request for multi-access edge computing processing by one or more computers; determining, for the user equipment, a second duration for a second timer that identifies a time after the first timer expires when the user equipment should enter a sleep mode if the user equipment has not received result data responsive to the uplink information; and transmitting, to the user equipment, the first duration for the first timer and the second duration for the second timer.

In accordance with one aspect of the present disclosure, a method can include maintaining a queue with at least one entry for high priority data transmissions with a user equipment that submits uplink information as part of a request for multi-access edge computing processing by one or more computers; receiving, from the one or more computers, result data responsive to the uplink information; placing the result data in a high priority data transmission entry in the queue; and providing, to the user equipment, the result data based at least in part on the high priority data transmission entry in the queue.

The details of one or more embodiments of these systems and methods are set forth in the accompanying drawings and the description below. Other features, objects, and advantages of these systems and methods will be apparent from the description and drawings, and from the claims.

DETAILED DESCRIPTION

The present disclosure relates to offloading computation tasks to one or more computers, e.g., that implement an edge server. Offloading computation tasks to the edge server can include offloading uplink (UL) traffic followed by downlink (DL) traffic, where the context information about computation tasks is transmitted in UL, and the results of the computation is transmitted in DL. A user equipment (UE) can use the present disclosure to reduce power usage, latency in receiving the computation results, or both.

Figure 1:
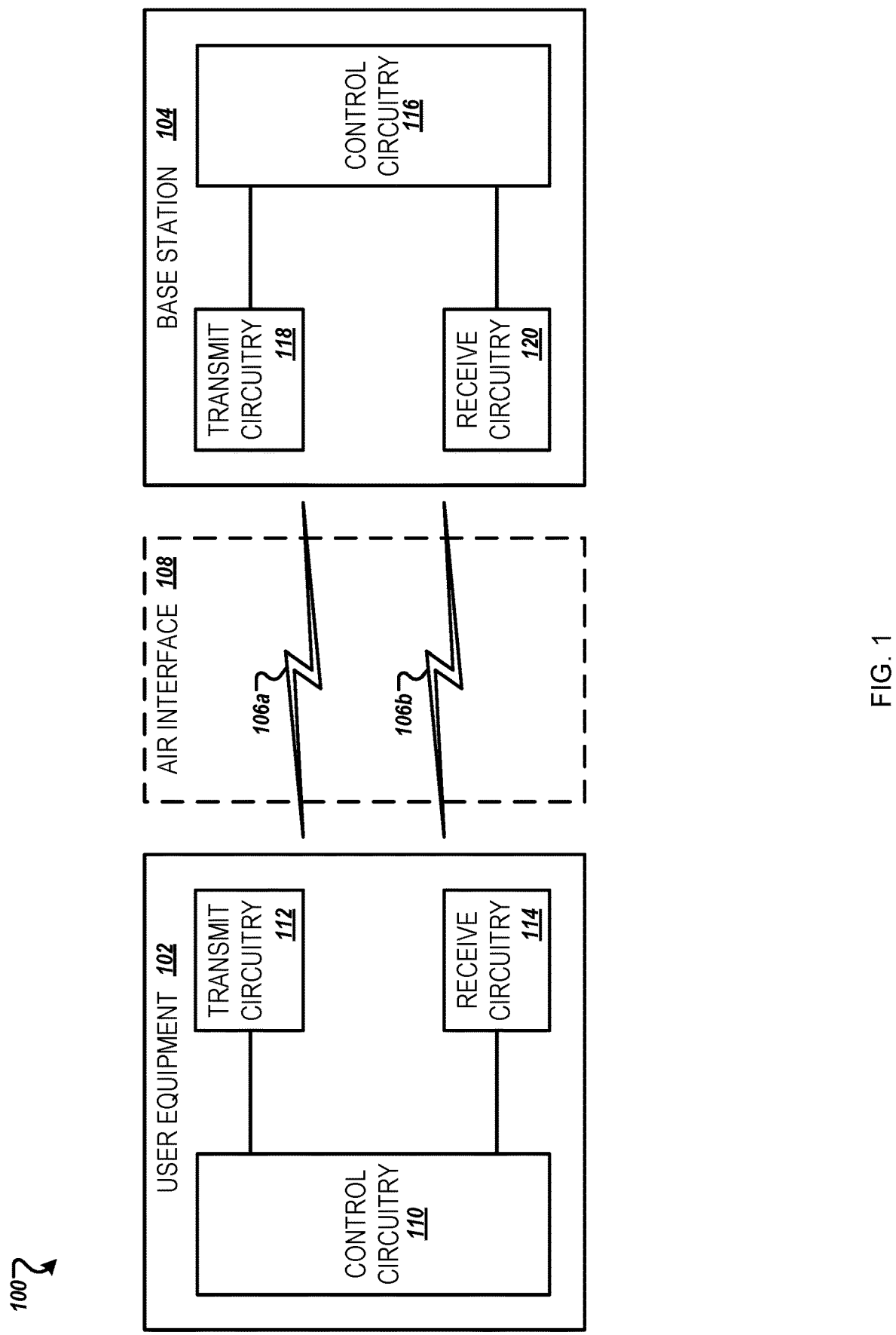
FIG. 1 illustrates a wireless network, according to some implementations.

FIG. 1 illustrates a wireless network 100, according to some implementations. The wireless network 100 includes a UE 102 and a base station 104 connected via one or more channels 106A, 106B across an air interface 108. The UE 102 and base station 104 communicate using a system that supports controls for managing the access of the UE 102 to a network via the base station 104.

In some implementations, the wireless network 100 may be a Non-Standalone (NSA) network that incorporates Long Term Evolution (LTE) and Fifth Generation (5G) New Radio (NR) communication standards as defined by the Third Generation Partnership Project (3GPP) technical specifications. For example, the wireless network 100 may be a E-UTRA (Evolved Universal Terrestrial Radio Access)-NR Dual Connectivity (EN-DC) network, or a NR-EUTRA Dual Connectivity (NE-DC) network. However, the wireless network 100 may also be a Standalone (SA) network that incorporates only 5G NR. Furthermore, other types of communication standards are possible, including future 3GPP systems (e.g., Sixth Generation (6G)) systems, Institute of Electrical and Electronics Engineers (IEEE) 802.11 technology (e.g., IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies), IEEE 802.16 protocols (e.g., WMAN, WiMAX, etc.), or the like. While aspects may be described herein using terminology commonly associated with 5G NR, aspects of the present disclosure can be applied to other systems, such as 3G, 4G, and/or systems subsequent to 5G (e.g., 6G).

In the wireless network 100, the UE 102 and any other UE in the system may be, for example, laptop computers, smartphones, tablet computers, machine-type devices such as smart meters or specialized devices for healthcare, intelligent transportation systems, or any other wireless devices with or without a user interface. In network 100, the base station 104 provides the UE 102 network connectivity to a broader network (not shown). This UE 102 connectivity is provided via the air interface 108 in a base station service area provided by the base station 104. In some implementations, such a broader network may be a wide area network operated by a cellular network provider, or may be the Internet. Each base station service area associated with the base station 104 is supported by antennas integrated with the base station 104. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector.

The UE 102 includes control circuitry 110 coupled with transmit circuitry 112 and receive circuitry 114. The transmit circuitry 112 and receive circuitry 114 may each be coupled with one or more antennas. The control circuitry 110 may include various combinations of application-specific circuitry and baseband circuitry. The transmit circuitry 112 and receive circuitry 114 may be adapted to transmit and receive data, respectively, and may include radio frequency (RF) circuitry or front-end module (FEM) circuitry.

In various implementations, aspects of the transmit circuitry 112, receive circuitry 114, and control circuitry 110 may be integrated in various ways to implement the operations described herein. The control circuitry 110 may be adapted or configured to perform various operations such as those described elsewhere in this disclosure related to a UE. For instance, the control circuitry 110 can determine whether uplink information has been fully transmitted, trigger a sleep mode, start a timer, determine whether a time has expired, trigger a sleep mode, trigger a wake mode, or a combination of two or more of these.

The transmit circuitry 112 can perform various operations described in this specification. For example, the transmit circuitry 112 can transmit the uplink information. Additionally, the transmit circuitry 112 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 112 may be configured to receive block data from the control circuitry 110 for transmission across the air interface 108.

The receive circuitry 114 can perform various operations described in this specification. For instance, the receive circuitry 114 can receive the result data. Additionally, the receive circuitry 114 may receive a plurality of multiplexed downlink physical channels from the air interface 108 and relay the physical channels to the control circuitry 110. The plurality of downlink physical channels may be multiplexed according to TDM or FDM along with carrier aggregation. The transmit circuitry 112 and the receive circuitry 114 may transmit and receive both control data and content data (e.g., messages, images, video, etc.) structured within data blocks that are carried by the physical channels.

FIG. 1 also illustrates the base station 104. In implementations, the base station 104 may be an NG radio access network (RAN) or a 5G RAN, an E-UTRAN, a non-terrestrial cell, or a legacy RAN, such as a UTRAN or GERAN. As used herein, the term "NG RAN" or the like may refer to the base station 104 that operates in an NR or 5G wireless network 100, and the term "E-UTRAN" or the like may refer to a base station 104 that operates in an LTE or 4G wireless network 100. The UE 102 utilizes connections (or channels) 106A, 106B, each of which includes a physical communications interface or layer.

The base station 104 circuitry may include control circuitry 116 coupled with transmit circuitry 118 and receive circuitry 120. The transmit circuitry 118 and receive circuitry 120 may each be coupled with one or more antennas that may be used to enable communications via the air interface 108. The transmit circuitry 118 and receive circuitry 120 may be adapted to transmit and receive data, respectively, to any UE connected to the base station 104. The transmit circuitry 118 may transmit downlink physical channels includes of a plurality of downlink subframes. The receive circuitry 120 may receive a plurality of uplink physical channels from various UEs, including the UE 102.

In FIG. 1, the one or more channels 106A, 106B are illustrated as an air interface to enable communicative coupling, and can be consistent with cellular communications protocols, such as a GSM protocol, a CDMA network protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In implementations, the UE 102 may directly exchange communication data via a ProSe interface. The ProSe interface may alternatively be referred to as a sidelink (SL) interface and may include one or more logical channels, including but not limited to a Physical Sidelink Control Channel (PSCCH), a Physical Sidelink Control Channel (PSCCH), a Physical Sidelink Discovery Channel (PSDCH), and a Physical Sidelink Broadcast Channel (PSBCH).

Figure 2:
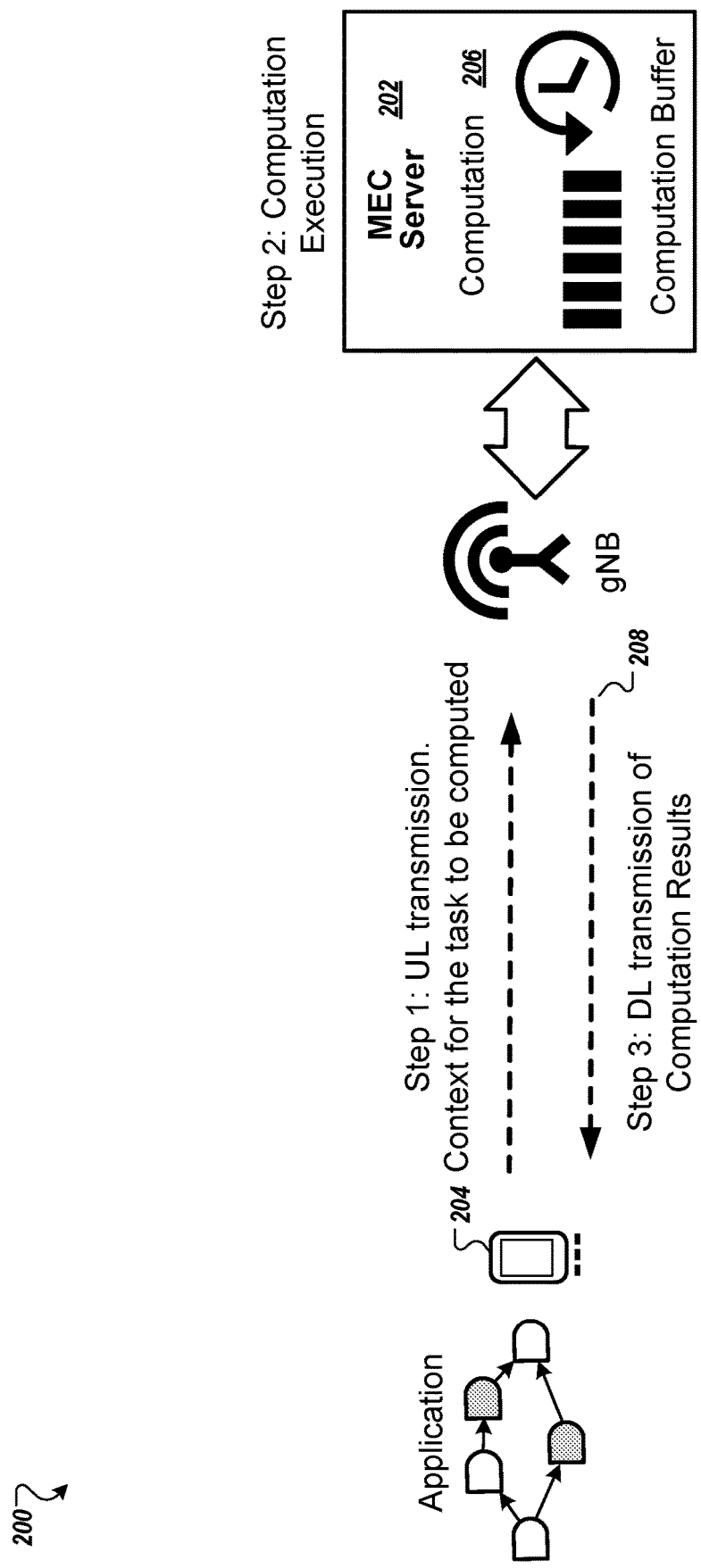
FIG. 2 depicts an example environment that includes a multi-access edge computing (MEC) communication.

FIG. 2 depicts an example environment 200 that includes a multi-access edge computing (MEC) communication. Offloading computation tasks to the MEC server 202 involves uplink (UL) traffic followed by downlink (DL) traffic, where the context information about computation tasks is transmitted in UL, and the results of the computation is transmitted in DL. A UE 204 can send an image to the MEC server 202 (see, e.g., step 1 in FIG. 1—UL), the MEC server 202 can perform a computation 206, e.g., detect and label objects in the image, (see, e.g., step 2 in FIG. 1—computation), and the MEC server then sends back a result, e.g., coordinates and labels of the objects of interest (see, e.g., step 3 in FIG. 1—DL).

The aforementioned traffic profile is not new per se (i.e., consider cloud offloading applications). However, low delay in-between UL and DL transmissions is the unique selling point of the edge computation, enabling the operation of latency-critical edge applications.

In addition, a cellular modem of the UE 204 does not take into account possible correlation between UL and DL traffic. That is, if Connected DRX (C-DRX) operation [TS38.321, Sec. 5.7] is configured for power saving, the UE 204 might go to sleep in-between UL transmission (TX) and DL reception (RX).

Figure 3:
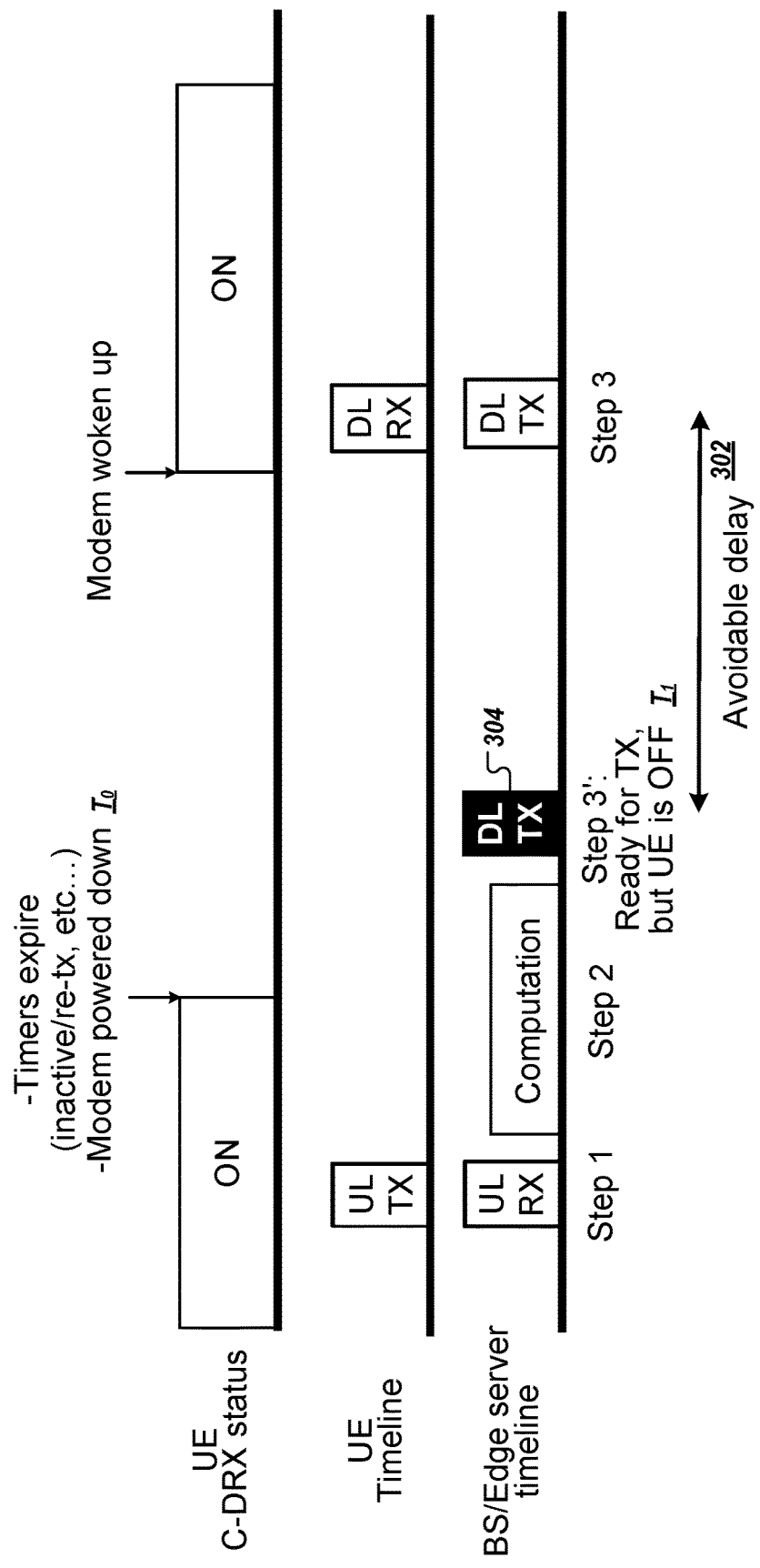
FIGS. 3-4 depict example timelines.

If the UE 204 goes into the sleep mode after UL transmissions, it stops monitoring downlink control channel (PDCCH) 208, and, thus, the transmission of the computation result is delayed till the next activation of the modem. FIG. 3 depicts an example timeline 300 that includes a delay 302 from when the UE goes to sleep at time $T_0$, and the DL transmission 304 is ready at time $T_1$, while the UE is asleep.

The delay 302 undermines the benefits of low-latency MEC, can cause degrading user experience, application failures, or a combination of these. The systems and methods described in this specification can provide lower-latency MEC, reduce a likelihood of application failures caused by delayed DL RX, reduce a likelihood of degraded user experience, or a combination of these.

In this specification, a system, a device, method, and computer program for avoiding C-DRX inflicted delays is described. The systems, methods, and devices described can avoid C-DRC while still allowing the use of C-DRX for power saving. In some implementations, the systems, devices, and methods can determine correlations of UL and DL traffic, address the problem of wake-ups in DRX state, or a combination of both.

Figure 4:
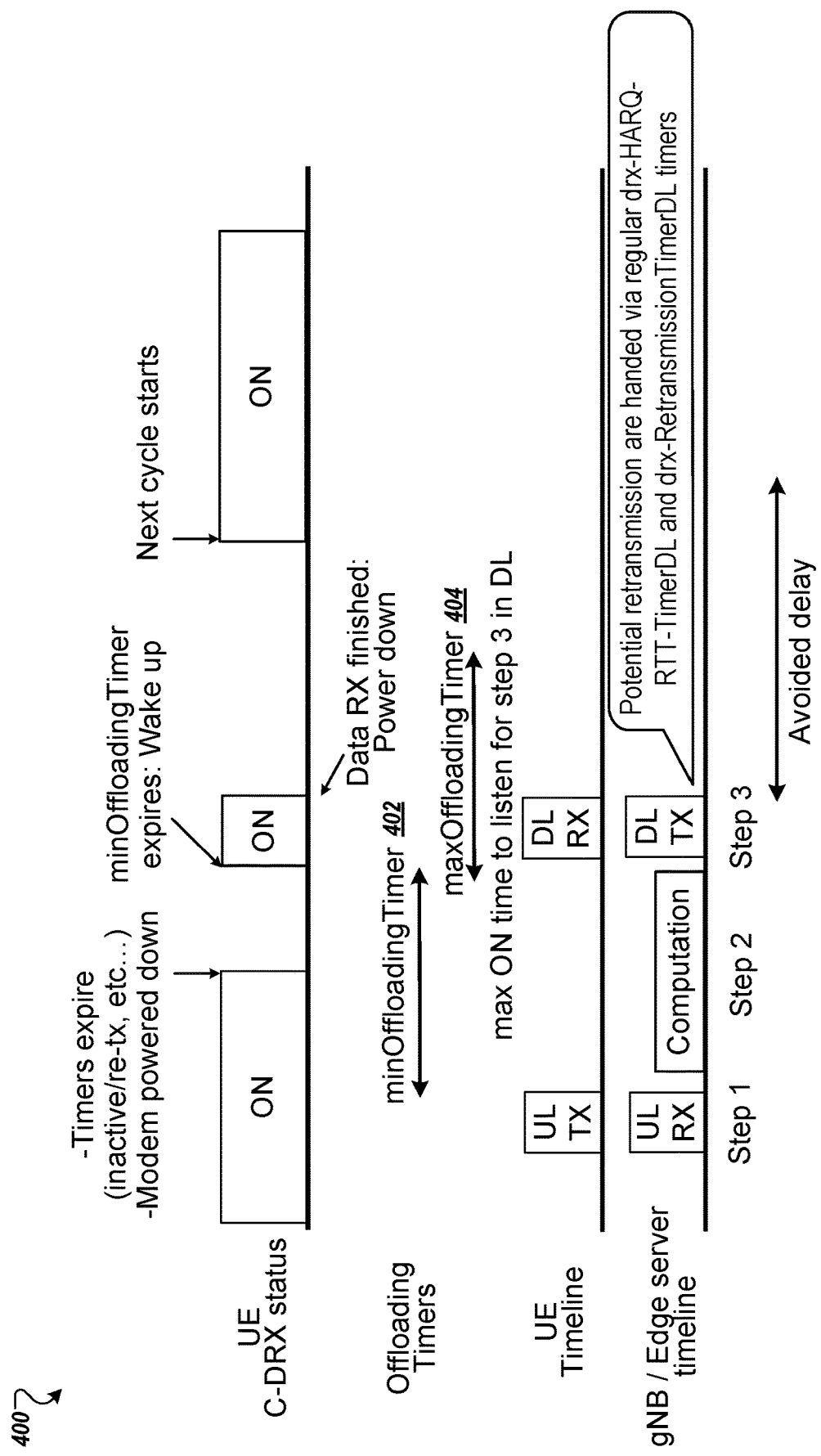

FIG. 4 depicts an example timeline 400 that includes two additional timers 402 and 404. A system, method, or device can use one or both of the additional timers 402 or 404 to control active time of a UE during C-DRX. These additional timers are referred to herein as a minOffloadingTimer 402 and a maxOffloadingTimer 404. A UE can start the minOffloadingTimer 402 once UL information is fully transmitted, e.g., to a MEC server, a gNB, or another appropriate device or system. The transmission can be over an air interface. Then, the UE can use the minOffloadingTimer 402 as an offset, allowing UE to go to sleep mode while the minOffloadingTimer 402 is running.

Once minOffloadingTimer 402 expires, the UE can start a maxOffloadingTimer 404 and UE wakes up to monitor PDCCH. In some examples, the UE might just wake up to monitor PDCCH.

Once the results of the offloaded computation task are received in DL, e.g., during step 3, the UE goes back to sleep mode.

Alternatively, if no data is received, e.g., when the computation has not completed before expiration of the maxOffloadingTimer 404, UE can go back to sleep after the maxOffloadingTimer 404 expires.

The maxOffloadingTimer 404 can start when the minOffloadingTimer 402 expires.

In some examples, the maxOffloadingTimer 404 can start at substantially the same time that the minOffloadingTimer 402 starts.

In some implementations, the minOffloadingTimer 402 and the maxOffloadingTimer 404 have the same effect as drx-HARQ-RTT-TimerUL and drx-RetransmissionTimerUL, which regulate modem wake-ups to listen for retransmission grants. In some implementations, these two timers can be re-used to wait for DL transmissions during task offloading.

In some implementations, the inactivityTimer can be re-used. While easier to configure, the inactivityTimer may lead to higher power consumption since it does not allow an offset, e.g., minOffloadingTimer 402, period, during which UE may go to sleep.

Regarding timer duration, the duration of the timers can be determined according to the expected duration of the offloading computation, the target latency requirement, an expected latency, or a combination of two or more of these. Computation duration can be either provided as information from MEC server or estimated by the UE or gNB, or a combination of two or more of these. The information can be provided in a form of an interval (e.g., 10 to 20 ms), percentiles (e.g., P5 10 ms to P95 30 ms), or as a Cumulative distribution function ("CDF").

Computation duration can be used by the UE to request DRX reconfiguration, or by gNB to trigger reconfiguration considering target latency and reliability requirements of an application. For instance, the UE can receive data indicating the MEC's configuration before the UE transmits uplink information. The UE can use the data to configure one or both of the timers 402 or 404. In some examples, the UE can configure one or both timers on an application level, e.g., when applications have different latency requirements.

In some implementations, a UE can connect to a server that is within a threshold physical distance from the UE. As the UE moves, the server to which the UE is connected can change. As a result, the UE can reconfigure one or both of the timers, e.g., using configuration data for the server to which the UE most recently connected.

In some implementations, an application layer can explicitly signal the modem to cancel offloading timers if the information is no longer needed, e.g., if field-of-view has changed and the requested information is not relevant. This can include canceling only one timer, e.g., the minOffloadingTimer 402, if only one timer is running. This can include canceling both timers if both timers are running.

In some implementations, correlation between UL and DL traffic can be estimated by analyzing traffic profile in the modem or at the gNB, or a combination of both, and does not require explicit signaling from MEC server or the application layer.

In some examples, (1) MEC server informs application layer of the UE that computation duration is estimated to be lower than 10 ms for 5% of the requests and higher than 30 ms for 5% of the requests; (2) Application layer indicates a maximum response latency of 20 ms; and, (3) UE requests DRX reconfiguration with minOffloadingTimer=10 ms and maxOffloadingTimer=20 ms. In this example, the maxOffloadingTimer 404 is lower than the highest specified computation time, since a response delayed more than 20 ms is not useful for the application layer. In this example, the maxOffloadingTimer 404 starts upon expiration of the minOffloadingTimer 402. In some examples, the maxOffloadingTimer 404 can be 30 ms, in which case the maxOffloadingTimer 404 can start at substantially the same time as the minOffloadingTimer 402.

In some implementations, one or more devices, systems, or both, can include configuration aspects for the use of timers, a MAC Control Element, QoS Flow IDs, or a combination of these.

In some implementations, timers can be configured in the UE re-using RRC procedures and extending DRX-Config Information Element (TS 38.331)—see Appendix A for exemplary extended DRX-Config IE. If UE requirements or computation duration have changed, UE can request to adjust the timers using UE Assistance Information (see 5.7.4 in 3GPP TS 38.331). For instance, the UE can send data to a gNB that indicates requirements of the UE for MEC, e.g., latency requirements. The UE can send the data using UE Assistance Information. The gNB can use the data to configure MEC, e.g., to determine a duration for one or both of the timers. The gNB can send one or both of the durations to the UE. If drx-HARQ-RTT-TimerUL and drx-RetransmissionTimerUL or Inactivity Timer are reused, no extension of DRX-Config IE is needed.

In some implementations, a UE uses a special MAC Control Element (e.g., from the reserved set according to TS 38.321 Table 6.2.1) attached to PUSCH to indicate that offloading timers must be used after this transmission. The gNB can use the special MAC control element to configure MEC, e.g., as described above.

In some implementations, the UE can use dedicated QoS Flow ID (QFI, see TS 23.501) for offloading packets, and offloading timers are pre-configured to be triggered for packets corresponding to this QFI. For instance, the UE can use one QoS Flow ID for time sensitive MEC requests and another QoS Flow ID for other requests.

Aspects of the present disclosure can relate to coexistence with other traffic profiles. In some implementations, a device, system or method can determine how to make sure that a special DL grant for MEC computation results is not wasted by gNB scheduler for any other DL traffic pending in the queue that could be delayed until the next regular onDuration.

In some implementations, a gNB has a-priori knowledge of 1) the size of the MEC computation results, 2) a range when MEC will deliver the data, or 3) both. A-priori knowledge is obtained, e.g. via UE Assistance Information mechanism. In such implementations, a gNB scheduler can put a placeholder with high priority into the queue and reserves a guaranteed bitrate for the max timer window.

In some implementations, a UE uses dedicated QFI for offloading traffic. PDCCH/PDSCH during the maxOffloadingTimer are reserved for this QFI or preemption is used for this QFI.

Figure 5:
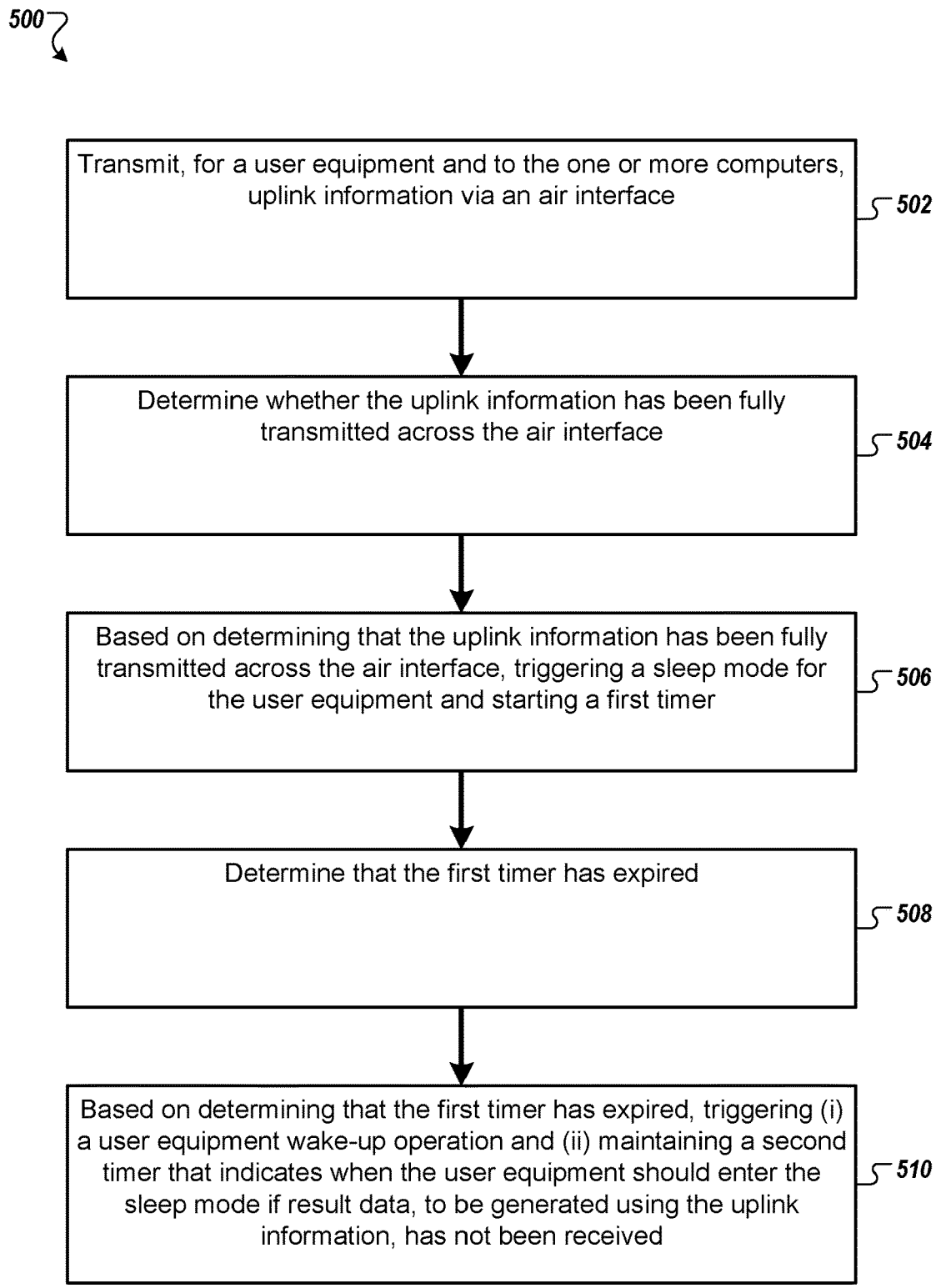
FIGS. 5-7 illustrate flowcharts of example methods, according to some implementations.

FIG. 5 illustrates a flowchart of an example method 500, according to some implementations. For clarity of presentation, the description that follows generally describes method 500 in the context of the other figures in this description. For example, method 500 can be performed by the user equipment 204, or one or more processors, e.g., baseband processors, for the user equipment of FIG. 2. It will be understood that method 500 can be performed, for example, by any suitable system, environment, software, hardware, or a combination of systems, environments, software, and hardware, as appropriate. In some implementations, various steps of method 500 can be run in parallel, in combination, in loops, or in any order.

The method 500 can include transmitting, for a user equipment and to the one or more computers, uplink information via an air interface (502); determining whether the uplink information has been fully transmitted across the air interface (504); based on determining that the uplink information has been fully transmitted across the air interface, triggering a sleep mode for the user equipment and starting a first timer (506); determining that the first timer has expired (508); and based on determining that the first timer has expired, triggering (i) a user equipment wake-up operation and (ii) maintaining a second timer that indicates when the user equipment should enter the sleep mode if result data, to be generated using the uplink information, has not been received (510).

Figure 6:
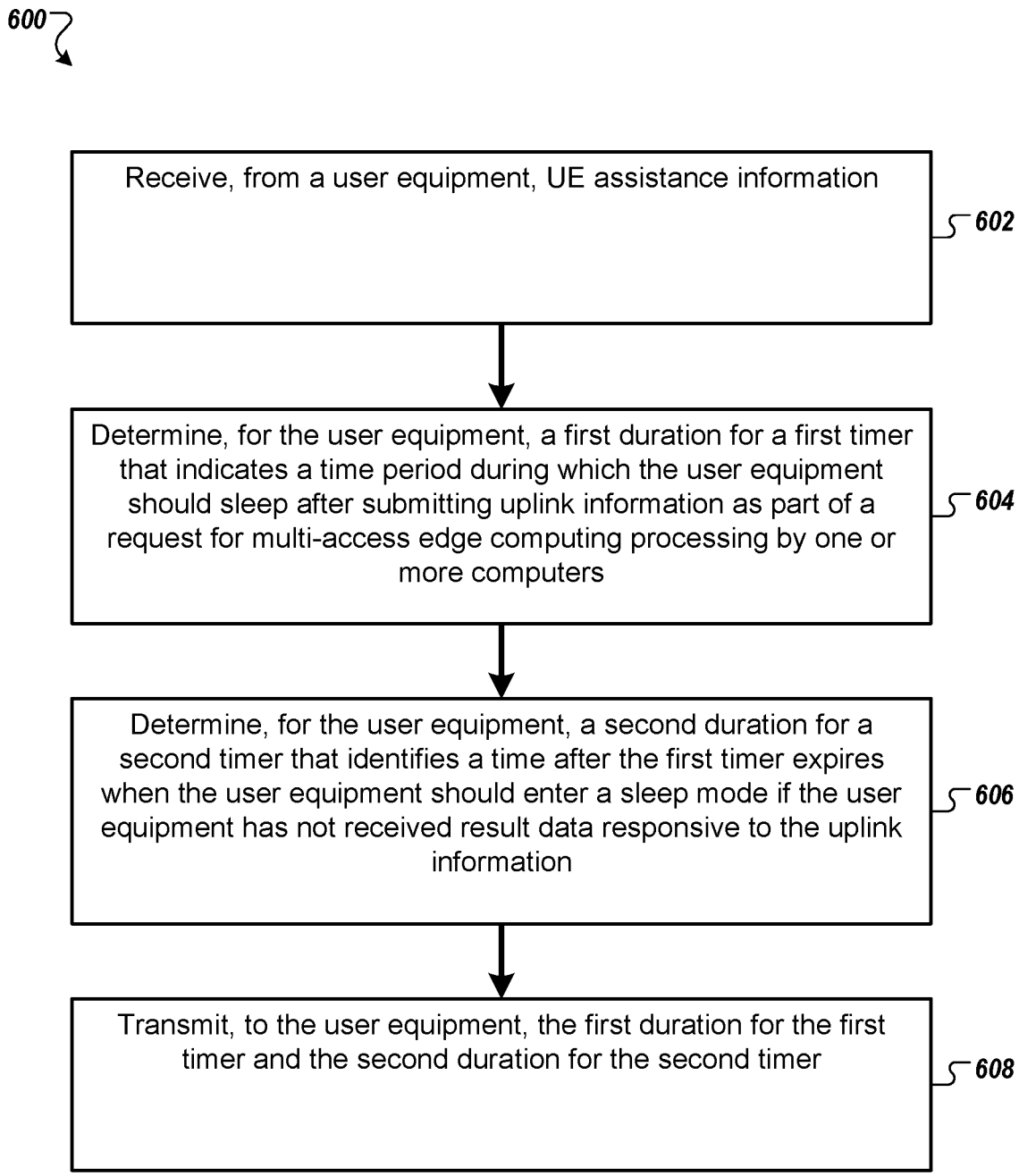

FIG. 6 illustrates a flowchart of an example method 600, according to some implementations. For clarity of presentation, the description that follows generally describes method 600 in the context of the other figures in this description. For example, method 600 can be performed by the user equipment 204, or one or more processors, e.g., baseband processors, for the user equipment of FIG. 2. It will be understood that method 600 can be performed, for example, by any suitable system, environment, software, hardware, or a combination of systems, environments, software, and hardware, as appropriate. In some implementations, various steps of method 600 can be run in parallel, in combination, in loops, or in any order.

The method 600 can include, optionally, receiving, from the user equipment, UE assistance information (602); determining, for the user equipment, a first duration for a first timer that indicates a time period during which the user equipment should sleep after submitting uplink information as part of a request for multi-access edge computing processing by one or more computers (604); determining, for the user equipment, a second duration for a second timer that identifies a time after the first timer expires when the user equipment should enter a sleep mode if the user equipment has not received result data responsive to the uplink information (606); and transmitting, to the user equipment, the first duration for the first timer and the second duration for the second timer (608).

Figure 7:
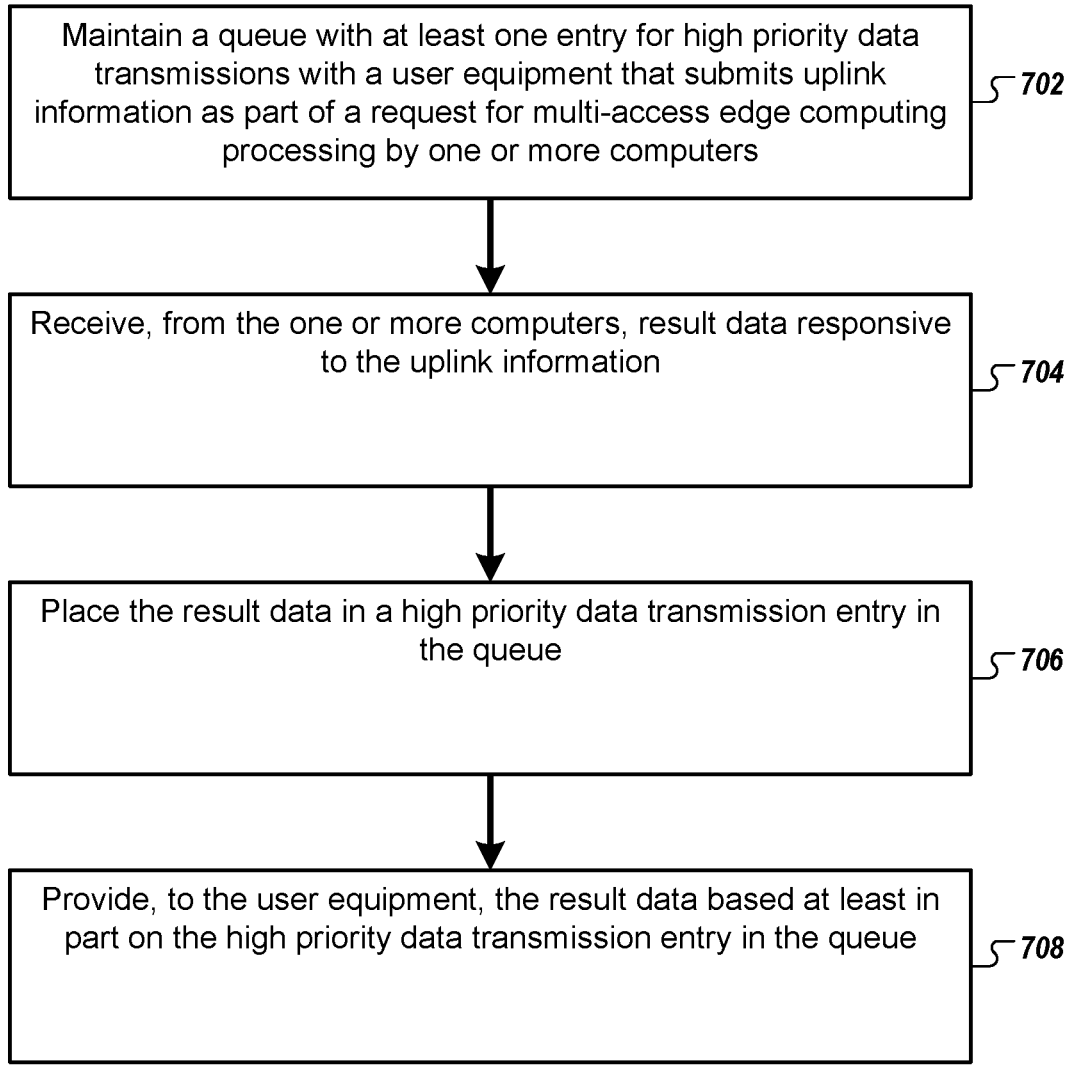

FIG. 7 illustrates a flowchart of an example method 700, according to some implementations. For clarity of presentation, the description that follows generally describes method 700 in the context of the other figures in this description. For example, method 700 can be performed by the user equipment 204, or one or more processors, e.g., baseband processors, for the user equipment of FIG. 2. It will be understood that method 700 can be performed, for example, by any suitable system, environment, software, hardware, or a combination of systems, environments, software, and hardware, as appropriate. In some implementations, various steps of method 700 can be run in parallel, in combination, in loops, or in any order.

The method 700 can include maintaining a queue with at least one entry for high priority data transmissions with a user equipment that submits uplink information as part of a request for multi-access edge computing processing by one or more computers (702); receiving, from the one or more computers, result data responsive to the uplink information (704); placing the result data in a high priority data transmission entry in the queue (706); and providing, to the user equipment, the result data based at least in part on the high priority data transmission entry in the queue (708).

The example methods 500, 600, and 700 shown in FIGS. 5-7 can be modified or reconfigured to include additional, fewer, or different steps (not shown in FIGS. 5-7), which can be performed in the order shown or in a different order or combined, at least in part.

Figure 8:
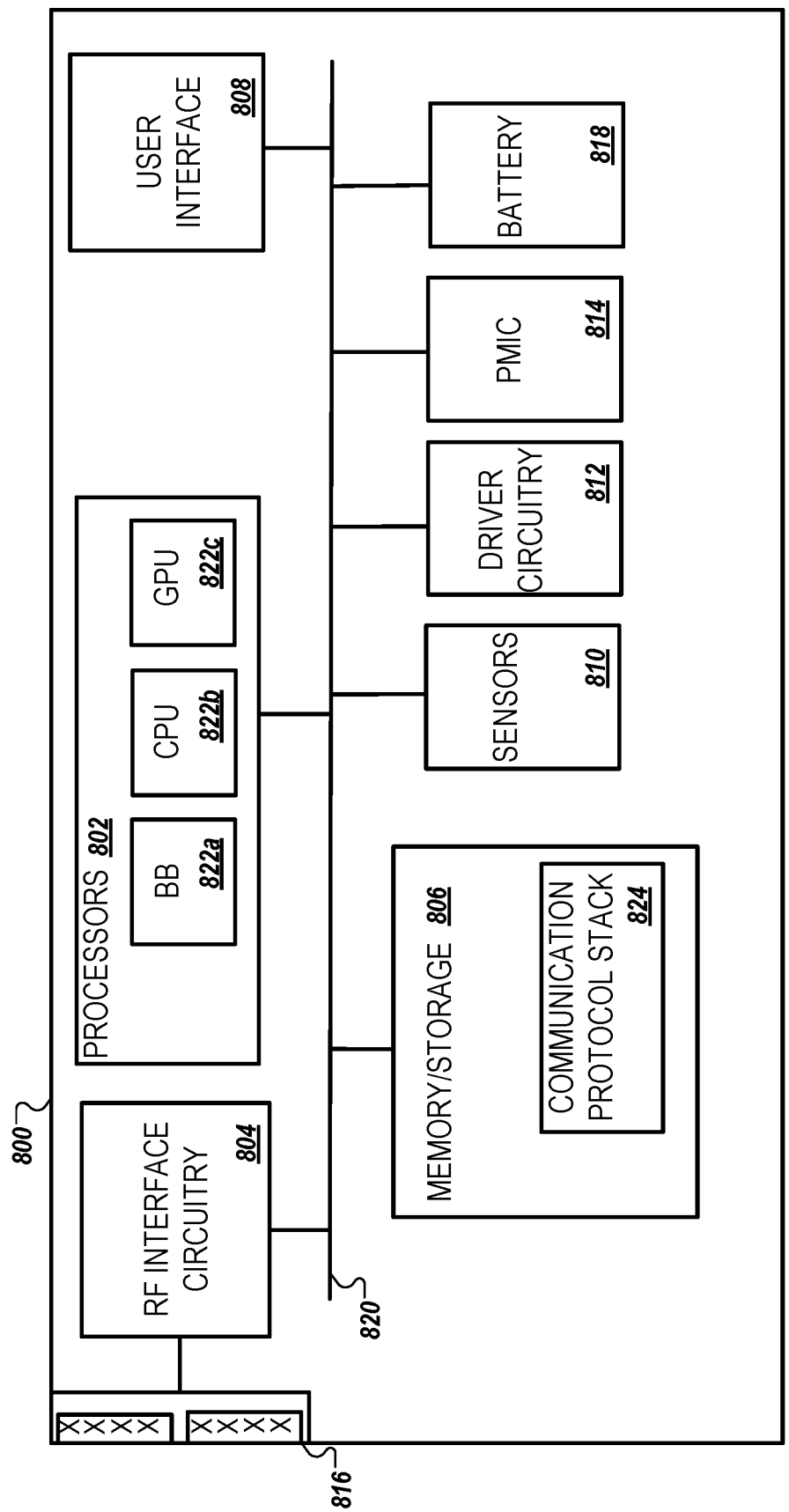
FIG. 8 illustrates a user equipment (UE), according to some implementations.

FIG. 8 illustrates a UE 800, according to some implementations. The UE 800 may be similar to and substantially interchangeable with UE 102 of FIG. 1.

The UE 800 may be any mobile or non-mobile computing device, such as, for example, mobile phones, computers, tablets, industrial wireless sensors (for example, microphones, pressure sensors, thermometers, motion sensors, accelerometers, inventory sensors, electric voltage/current meters, etc.), video devices (for example, cameras, video cameras, etc.), wearable devices (for example, a smart watch), relaxed-IoT devices.

The UE 800 may include processors 802, RF interface circuitry 804, memory/storage 806, user interface 808, sensors 810, driver circuitry 812, power management integrated circuit (PMIC) 814, antenna structure 816, and battery 818. The components of the UE 800 may be implemented as integrated circuits (ICs), portions thereof, discrete electronic devices, or other modules, logic, hardware, software, firmware, or a combination thereof. The block diagram of FIG. 8 is intended to show a high-level view of some of the components of the UE 800. However, some of the components shown may be omitted, additional components may be present, and different arrangement of the components shown may occur in other implementations.

The components of the UE 800 may be coupled with various other components over one or more interconnects 820, which may represent any type of interface, input/output, bus (local, system, or expansion), transmission line, trace, optical connection, etc. that allows various circuit components (on common or different chips or chipsets) to interact with one another.

The processors 802 may include processor circuitry such as, for example, baseband processor circuitry (BB) 822A, central processor unit circuitry (CPU) 822B, and graphics processor unit circuitry (GPU) 822C. The processors 802 may include any type of circuitry or processor circuitry that executes or otherwise operates computer-executable instructions, such as program code, software modules, or functional processes from memory/storage 806 to cause the UE 800 to perform operations as described herein.

In some implementations, the baseband processor circuitry 822A may access a communication protocol stack 824 in the memory/storage 806 to communicate over a 3GPP compatible network. In general, the baseband processor circuitry 822A may access the communication protocol stack to: perform user plane functions at a physical (PHY) layer, medium access control (MAC) layer, radio link control (RLC) layer, packet data convergence protocol (PDCP) layer, service data adaptation protocol (SDAP) layer, and PDU layer; and perform control plane functions at a PHY layer, MAC layer, RLC layer, PDCP layer, RRC layer, and a non-access stratum layer. In some implementations, the PHY layer operations may additionally/alternatively be performed by the components of the RF interface circuitry 804. The baseband processor circuitry 822A may generate or process baseband signals or waveforms that carry information in 3GPP-compatible networks. In some implementations, the waveforms for NR may be based cyclic prefix orthogonal frequency division multiplexing (OFDM) "CP-OFDM" in the uplink or downlink, and discrete Fourier transform spread OFDM "DFT-S-OFDM" in the uplink.

The memory/storage 806 may include one or more non-transitory, computer-readable media that includes instructions (for example, communication protocol stack 824) that may be executed by one or more of the processors 802 to cause the UE 800 to perform various operations described herein. The memory/storage 806 include any type of volatile or non-volatile memory that may be distributed throughout the UE 800. In some implementations, some of the memory/storage 806 may be located on the processors 802 themselves (for example, L1 and L2 cache), while other memory/storage 806 is external to the processors 802 but accessible thereto via a memory interface. The memory/storage 806 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 804 may include transceiver circuitry and radio frequency front module (RFEM) that allows the UE 800 to communicate with other devices over a radio access network. The RF interface circuitry 804 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 816 and proceed to filter and amplify (with a low-noise amplifier) the signal. The signal may be provided to a receiver of the transceiver that downconverts the RF signal into a baseband signal that is provided to the baseband processor of the processors 802.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 816. In various implementations, the RF interface circuitry 804 may be configured to transmit/receive signals in a manner compatible with NR access technologies.

The antenna 816 may include antenna elements to convert electrical signals into radio waves to travel through the air and to convert received radio waves into electrical signals. The antenna elements may be arranged into one or more antenna panels. The antenna 816 may have antenna panels that are omnidirectional, directional, or a combination thereof to enable beamforming and multiple input, multiple output communications. The antenna 816 may include microstrip antennas, printed antennas fabricated on the surface of one or more printed circuit boards, patch antennas, phased array antennas, etc. The antenna 816 may have one or more panels designed for specific frequency bands including bands in FR1 or FR2.

The user interface 808 includes various input/output (I/O) devices designed to enable user interaction with the UE 800. The user interface 808 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs), or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 800.

The sensors 810 may include devices, modules, or subsystems whose purpose is to detect events or changes in its environment and send the information (sensor data) about the detected events to some other device, module, subsystem, etc. Examples of such sensors include, inter alia, inertia measurement units including accelerometers, gyroscopes, or magnetometers; microelectromechanical systems or nanoelectromechanical systems including 3-axis accelerometers, 3-axis gyroscopes, or magnetometers; level sensors; temperature sensors (for example, thermistors); pressure sensors; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 812 may include software and hardware elements that operate to control particular devices that are embedded in the UE 800, attached to the UE 800, or otherwise communicatively coupled with the UE 800. The driver circuitry 812 may include individual drivers allowing other components to interact with or control various input/output (I/O) devices that may be present within, or connected to, the UE 800. For example, driver circuitry 812 may include a display driver to control and allow access to a display device, a touchscreen driver to control and allow access to a touchscreen interface, sensor drivers to obtain sensor readings of sensor circuitry 828 and control and allow access to sensor circuitry 828, drivers to obtain actuator positions of electro-mechanic components or control and allow access to the electro-mechanic components, a camera driver to control and allow access to an embedded image capture device, audio drivers to control and allow access to one or more audio devices.

The PMIC 814 may manage power provided to various components of the UE 800. In particular, with respect to the processors 802, the PMIC 814 may control power-source selection, voltage scaling, battery charging, or DC-to-DC conversion.

In some implementations, the PMIC 814 may control, or otherwise be part of, various power saving mechanisms of the UE 800. A battery 818 may power the UE 800, although in some examples the UE 800 may be mounted deployed in a fixed location, and may have a power supply coupled to an electrical grid. The battery 818 may be a lithium ion battery, a metal-air battery, such as a zinc-air battery, an aluminum-air battery, a lithium-air battery, and the like. In some implementations, such as in vehicle-based applications, the battery 818 may be a typical lead-acid automotive battery.

Figure 9:
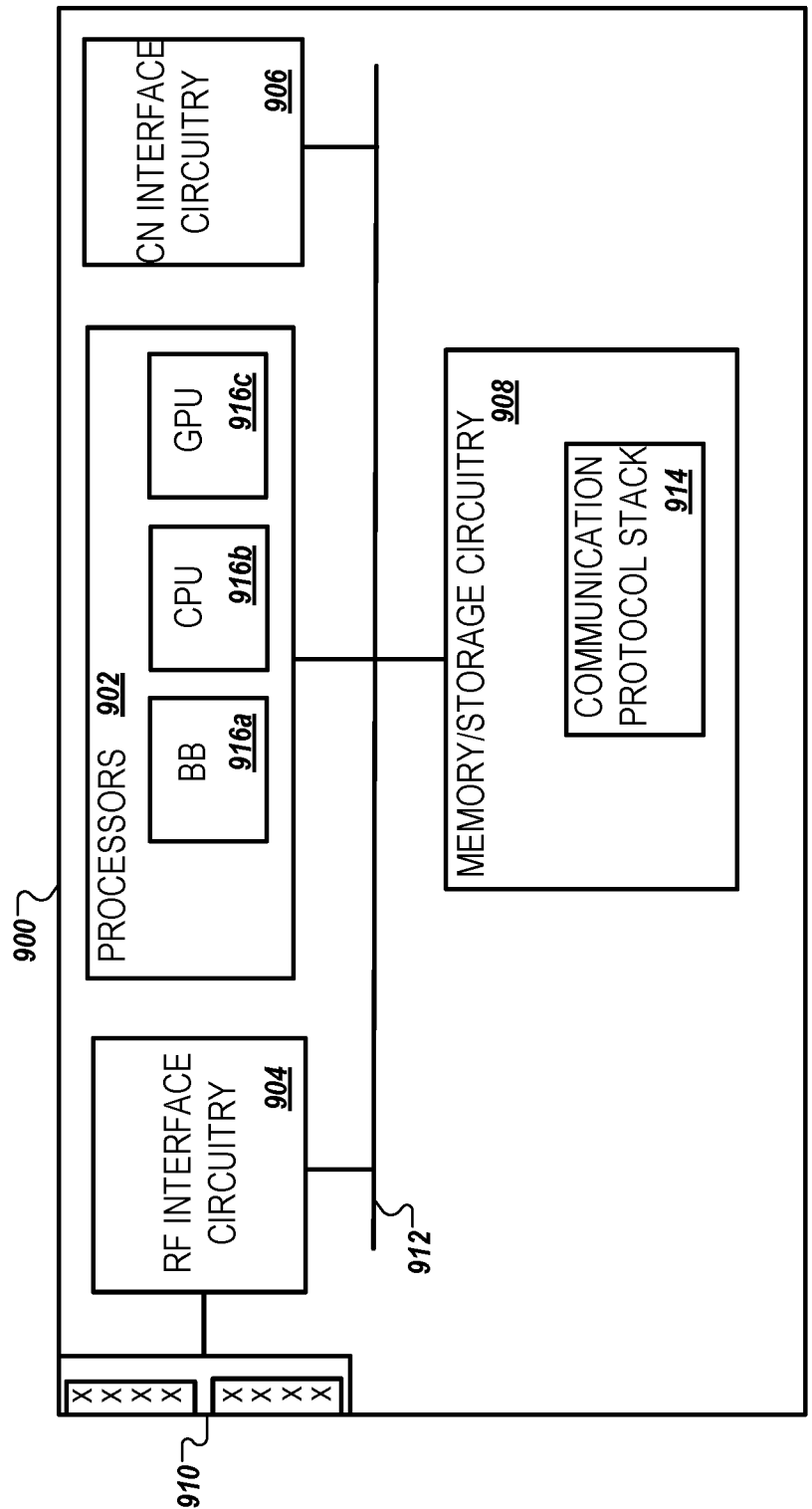
FIG. 9 illustrates an access node, according to some implementations.

FIG. 9 illustrates an access node 900 (e.g., a base station or gNB), according to some implementations. The access node 900 may be similar to and substantially interchangeable with base station 104. The access node 900 may include processors 902, RF interface circuitry 904, core network (CN) interface circuitry 906, memory/storage circuitry 908, and antenna structure 910.

The components of the access node 900 may be coupled with various other components over one or more interconnects 912. The processors 902, RF interface circuitry 904, memory/storage circuitry 908 (including communication protocol stack 914), antenna structure 910, and interconnects 912 may be similar to like-named elements shown and described with respect to FIG. 8. For example, the processors 902 may include processor circuitry such as, for example, baseband processor circuitry (BB) 916A, central processor unit circuitry (CPU) 916B, and graphics processor unit circuitry (GPU) 916C.

The CN interface circuitry 906 may provide connectivity to a core network, for example, a 5th Generation Core network (5GC) using a 5GC-compatible network interface protocol such as carrier Ethernet protocols, or some other suitable protocol. Network connectivity may be provided to/from the access node 900 via a fiber optic or wireless backhaul. The CN interface circuitry 906 may include one or more dedicated processors or FPGAs to communicate using one or more of the aforementioned protocols. In some implementations, the CN interface circuitry 906 may include multiple controllers to provide connectivity to other networks using the same or different protocols.

As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can include ground stations (e.g., terrestrial access points) or satellite stations providing coverage within a geographic area (e.g., a cell). As used herein, the term "NG RAN node" or the like may refer to an access node 900 that operates in an NR or 5G system (for example, a gNB), and the term "E-UTRAN node" or the like may refer to an access node 900 that operates in an LTE or 4G system (e.g., an eNB). According to various implementations, the access node 900 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the access node 900 may be implemented as one or more software entities running on server computers as part of a virtual network, which may be referred to as a CRAN and/or a virtual baseband unit pool (vBBUP). In V2X scenarios, the access node 900 may be or act as a "Road Side Unit." The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

In the following sections, further exemplary embodiments are provided.

Example 1 includes transmitting, for a user equipment and to the one or more computers, uplink information via an air interface; determining whether the uplink information has been fully transmitted across the air interface; based on determining that the uplink information has been fully transmitted across the air interface, triggering a sleep mode for the user equipment and starting a first timer; determining that the first timer has expired; and based on determining that the first timer has expired, triggering (i) a user equipment wake-up operation and (ii) maintaining a second timer that indicates when the user equipment should enter the sleep mode if result data, to be generated using the uplink information, has not been received.

Example 2 includes where the first timer is a minOffloading timer.

Example 3 includes determining, prior to starting the first timer, a duration for the first timer using at least one of an expected duration to offload a task performed using the uplink information, or a target latency.

Example 4 includes the duration of the timers can be determined according to the expected duration of the offloading computation, the target latency requirement, an expected latency, or a combination of two or more of these.

Example 5 includes receiving data indicating the expected duration to offload the task performed using the uplink information.

Example 6 includes Computation duration can be either provided as information from MEC server or estimated by the UE or gNB, or a combination of two or more of these. The information can be provided in a form of an interval (e.g., 10 to 20 ms), percentiles (e.g., P5 10 ms to P95 30 ms), or as a CDF.

Example 7 includes, where the second timer is a maxOffloading timer.

Example 8 includes, where starting the first timer may include starting the first timer and the second timer based on determining that the uplink information has been fully transmitted across the air interface.

Example 9 includes the control circuitry 110 that can determine whether uplink information has been fully transmitted, trigger a sleep mode, start a timer, determine whether a time has expired, trigger a sleep mode, trigger a wake mode, or a combination of two or more of these.

Example 10 includes starting the second timer based on determining that the first timer has expired.

Example 11 includes receiving result data that is generated, by a computer other than the user equipment, based on processing, by the one or more computers, the uplink information.

Example 12 includes offloading computation tasks to the MEC server involves uplink (UL) traffic followed by downlink (DL) traffic, where the context information about computation tasks is transmitted in UL, and the results of the computation is transmitted in DL.

Example 13 includes a UE sending an image to the MEC server, the MEC server performing a computation, e.g., detect and label objects in the image, the MEC server sending back a result, e.g., coordinates and labels of the objects of interest.

Example 14 includes determining that the result data was not received prior to expiration of the second timer; and based on determining that result data was not received prior to expiration of the second timer, triggering the sleep mode for the user equipment.

Example 15 includes, prior to transmitting the uplink information, determining, for a task defined by the uplink information, whether an amount of computational resources predicted to be used to perform the task satisfies a computational threshold, where transmitting is responsive to determining that the amount of computational resources predicted to be used to perform the task satisfies the computational threshold.

Example 16 includes offload processing for latency-sensitive applications, applications that require more computational power than the UE current has, e.g., given battery limitations, or both.

Example 17 includes determining that the result data is no longer needed; and canceling at least one of the first timer and the second timer.

Example 18 includes an application layer explicitly signaling the modem to cancel offloading timers if the information is no longer needed, e.g., if field-of-view has changed and the requested information is not relevant.

Example 19 includes determining, for a user equipment, a first duration for a first timer that indicates a time period during which the user equipment should sleep after submitting uplink information as part of a request for multi-access edge computing processing by one or more computers; determining, for the user equipment, a second duration for a second timer that identifies a time after the first timer expires when the user equipment should enter a sleep mode if the user equipment has not received result data responsive to the uplink information; and transmitting, to the user equipment, the first duration for the first timer and the second duration for the second timer.

Example 20 includes, where the first timer is a minOffloading timer.

Example 21 includes, where the second timer is a maxOffloading timer.

Example 22 includes receiving, from the user equipment, UE assistance information, where: determining the first duration is based at least in part on the UE assistance information; and determining the second duration is based at least in part on the UE assistance information.

Example 23 includes If UE requirements or computation duration have changed, UE can request to adjust the timers using UE Assistance Information.

Example 24 includes the UE can send data to a gNB that indicates requirements of the UE for MEC, e.g., latency requirements.

Example 24 includes the UE can send the data using UE Assistance Information.

Example 26 includes the gNB can use the data to configure MEC, e.g., to determine a duration for one or both of the timers.

Example 27 includes the gNB can send one or both of the durations to the UE. If drx-HARQ-RTT-TimerUL and drx-RetransmissionTimerUL or InactivityTimer are reused, no extension of DRX-Config IE is needed.

Example 28 includes maintaining a queue with at least one entry for high priority data transmissions with the user equipment; receiving, from the one or more computers, the result data responsive to the uplink information; placing the result data in a high priority data transmission entry in the queue; and providing, to the user equipment, the result data based at least in part on the high priority data transmission entry in the queue.

Example 29 includes maintaining a second queue for non-high priority data transmissions, where all entries in the queue are for high priority data transmissions.

Example 30 includes, where the queue may include entries for one or more non-high priority data transmissions.

Example 31 includes, where the at least one entry for high priority data transmissions may include a placeholder.

Example 32 includes, wherein placing the result data in the queue may include placing the result data in one of the at least one entry for high priority data transmissions that is a placeholder in the queue.

Example 33 includes maintaining a queue with at least one entry for high priority data transmissions with a user equipment that submits uplink information as part of a request for multi-access edge computing processing by one or more computers; receiving, from the one or more computers, result data responsive to the uplink information; placing the result data in a high priority data transmission entry in the queue; and providing, to the user equipment, the result data based at least in part on the high priority data transmission entry in the queue.

Example 34 includes maintaining a second queue for non-high priority data transmissions, where all entries in the queue are for high priority data transmissions.

Example 35 may include one or more non-transitory computer-readable media including instructions to cause an electronic device, upon execution of the instructions by one or more processors of the electronic device, to perform one or more elements of a method described in or related to any of examples 1-34, or any other method or process described herein.

Example 36 may include an apparatus including logic, modules, or circuitry to perform one or more elements of a method described in or related to any of examples 1-34, or any other method or process described herein.

Example 37 may include a method, technique, or process as described in or related to any of examples 1-34, or portions or parts thereof.

Example 38 may include an apparatus including: one or more processors and one or more computer-readable media including instructions that, when executed by the one or more processors, cause the one or more processors to perform the method, techniques, or process as described in or related to any of examples 1-34, or portions thereof.

Example 39 may include a signal as described in or related to any of examples 1-34, or portions or parts thereof.

Example 40 may include a datagram, information element, packet, frame, segment, PDU, or message as described in or related to any of examples 1-34, or portions or parts thereof, or otherwise described in the present disclosure.

Example 41 may include a signal encoded with data as described in or related to any of examples 1-34, or portions or parts thereof, or otherwise described in the present disclosure.

Example 42 may include a signal encoded with a datagram, IE, packet, frame, segment, PDU, or message as described in or related to any of examples 1-34, or portions or parts thereof, or otherwise described in the present disclosure.

Example 43 may include an electromagnetic signal carrying computer-readable instructions, wherein execution of the computer-readable instructions by one or more processors is to cause the one or more processors to perform the method, techniques, or process as described in or related to any of examples 1-34, or portions thereof.

Example 44 may include a computer program including instructions, wherein execution of the program by a processing element is to cause the processing element to carry out the method, techniques, or process as described in or related to any of examples 1-34, or portions thereof. The operations or actions performed by the instructions executed by the processing element can include the methods of any one of examples 1-34.

Example 45 may include a signal in a wireless network as shown and described herein.

Example 46 may include a method of communicating in a wireless network as shown and described herein.

Example 47 may include a system for providing wireless communication as shown and described herein. The operations or actions performed by the system can include the methods of any one of examples 1-34.

Example 48 may include a device for providing wireless communication as shown and described herein. The operations or actions performed by the device can include the methods of any one of examples 1-34.

The previously-described examples 1-34 are implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

A system, e.g., a base station, an apparatus including one or more baseband processors, and so forth, can be configured to perform particular operations or actions by virtue of having software, firmware, hardware, or a combination of them installed on the system that in operation causes or cause the system to perform the actions. The operations or actions performed either by the system can include the methods of any one of examples 1-34.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed.

Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method for offloading computing tasks to one or more computers, the method comprising:
   preparing instructions for transmission, to the one or more computers, of context information about the computing tasks to be offloaded from a user equipment to the one or more computers via an air interface;
   determining whether the context information has been fully transmitted across the air interface to the one or more computers;
   based on determining that the context information has been fully transmitted across the air interface, triggering a sleep mode for the user equipment and starting a first timer;
   determining that the first timer has expired;
   based on determining that the first timer has expired, (i) triggering a user equipment wake-up operation to check for result data of the computing tasks and (ii) maintaining a second timer that indicates when the user equipment should enter the sleep mode if the result data of the computing tasks, to be generated using the context information, has not been received, wherein the second timer is used to wait for the result data of the computing tasks; and
   determining whether the result data was not received prior to expiration of the second timer or the result data is no longer needed.

2. The method of claim 1, wherein the first timer is a minOffloading timer.

3. The method of claim 1, comprising determining, prior to starting the first timer, a duration for the first timer using at least one of an expected duration to offload a computing task performed using the context information, or a target latency.

4. The method of claim 3, comprising receiving data indicating the expected duration to offload the task performed using the context information.

5. The method of claim 1, wherein the second timer is a maxOffloading timer.

6. The method of claim 1, wherein starting the first timer comprises starting the first timer and the second timer based on determining that the context information has been fully transmitted across the air interface.

7. The method of claim 1, comprising starting the second timer based on determining that the first timer has expired.

8. The method of claim 1, comprising receiving result data that is generated, by a computer other than the user equipment, based on processing, by the one or more computers, the context information.

9. The method of claim 1, comprising:
   determining that the result data was not received prior to expiration of the second timer; and
   based on determining that result data was not received prior to expiration of the second timer, triggering the sleep mode for the user equipment.

10. The method of claim 1, comprising, prior to preparing the instructions for transmission of the context information, determining, for a computing task defined by the context information, whether an amount of computational resources predicted to be used to perform the task satisfies a computational threshold, wherein preparing the instructions for transmission of the context information is responsive to determining that the amount of computational resources predicted to be used to perform the task satisfies the computational threshold.

11. The method of claim 1, comprising:
    determining that the result data is no longer needed; and
    canceling at least one of the first timer and the second timer.

12. An apparatus comprising processing circuitry and memory on which are stored instructions that are operable, when executed by the processing circuitry, to cause the processing circuitry to perform operations comprising:
    preparing instructions for transmission, to one or more computers, uplink of context information about computing tasks to be offloaded from a user equipment to the one or more computers via an air interface;
    determining whether the context information has been fully transmitted across the air interface to the one or more computers;
    based on determining that the context information has been fully transmitted across the air interface, triggering a sleep mode for the user equipment and starting a first timer;
    determining whether the first timer has expired;
    based on determining that the first timer has expired, (i) triggering a user equipment wake-up operation for the user equipment to check for result data of the computing tasks and (ii) maintaining a second timer that indicates when the user equipment should re-enter the sleep mode if the result data of the computing tasks, to be generated using the context information, has not been received, wherein the second timer is used to wait for the result data of the computing tasks; and
    determining whether the result data was not received prior to expiration of the second timer or the result data is no longer needed.

13. The apparatus of claim 12, wherein the first timer is a minOffloading timer.

14. The apparatus of claim 12, wherein the operations comprise determining, prior to starting the first timer, a duration for the first timer using at least one of an expected duration to offload a computing task performed using the context information, or a target latency.

15. The apparatus of claim 14, wherein the operations comprise receiving data indicating the expected duration to offload the task performed using the context information.

16. The apparatus of claim 12, wherein the second timer is a maxOffloading timer.

17. The apparatus of claim 12, wherein starting the first timer comprises starting the first timer and the second timer based on determining that the context information has been fully transmitted across the air interface.

18. The apparatus of claim 12, wherein the operations comprise starting the second timer based on determining that the first timer has expired.

19. The apparatus of claim 12, wherein the operations comprise receiving result data that is generated, by a computer other than the user equipment, based on processing, by the one or more computers, the context information.

20. One or more non-transitory computer storage media encoded with instructions that, when executed by processing circuitry, cause the processing circuitry to perform operations comprising:
- preparing instructions for transmission, to one or more computers, of context information about computing tasks to be offloaded from a user equipment to the one or more computers via an air interface;
- determining whether the context information has been fully transmitted across the air interface to the one or more computers;
- based on determining that the context information has been fully transmitted across the air interface, triggering a sleep mode for the user equipment and starting a first timer;
- determining that the first timer has expired;
- based on determining that the first timer has expired, (i) triggering a user equipment wake-up operation to check for result data of the computing tasks and (ii) maintaining a second timer that indicates when the user equipment should enter the sleep mode if the result data of the computing tasks, to be generated using the context information, has not been received, wherein the second timer is used to wait for the result data of the computing tasks;
- monitoring, using the air interface, for receipt of result data generated using the context information; and
- determining whether the result data was not received prior to expiration of the second timer or the result data is no longer needed.

* * * * *